US009460398B2

(12) United States Patent
Sung et al.

(10) Patent No.: US 9,460,398 B2
(45) Date of Patent: Oct. 4, 2016

(54) APPARATUS AND METHOD FOR RECOGNIZING USER ACTIVITY

(75) Inventors: Jae-Mo Sung, Hwaseong-si (KR);
Sun-Jae Lee, Seongnam-si (KR);
Seungjin Choi, Pohang-si (KR)

(73) Assignees: Samsung Electronics Co., Ltd.,
Suwon-si (KR); **Postech
Academy-Industry Foundation**,
Pohang-si (KR)

( * ) Notice: Subject to any disclaimer, the term of this patent is extended or adjusted under 35 U.S.C. 154(b) by 402 days.

(21) Appl. No.: 13/614,546

(22) Filed: Sep. 13, 2012

(65) Prior Publication Data

US 2013/0262352 A1 Oct. 3, 2013

(30) Foreign Application Priority Data

Mar. 29, 2012 (KR) ........................ 10-2012-0032615

(51) Int. Cl.
*G06K 9/00* (2006.01)
*G06N 99/00* (2010.01)

(52) U.S. Cl.
CPC ......... *G06N 99/005* (2013.01); *G06K 9/00342* (2013.01)

(58) Field of Classification Search
None
See application file for complete search history.

(56) References Cited

U.S. PATENT DOCUMENTS 6,409,687 B1 * 6/2002 Foxlin ........................... 600/595
7,421,369 B2 * 9/2008 Clarkson ....................... 702/150
8,031,120 B2 * 10/2011 Smith et al. .................. 342/451
8,079,962 B2 12/2011 Takai et al.
8,438,127 B2 * 5/2013 Kurata et al. .................. 706/48
2010/0117959 A1 5/2010 Hong et al.
2011/0282828 A1 * 11/2011 Precup et al. ................. 706/54

FOREIGN PATENT DOCUMENTS

| JP | 4595555 B2 | 12/2010 |
|---|---|---|
| KR | 10-2006-0008006 A | 1/2006 |
| KR | 10-0693594 B1 | 3/2007 |

(Continued)

OTHER PUBLICATIONS

Wan-Young Chung; Purwar, A; Sharma, A, "Frequency domain approach for activity classification using accelerometer," Engineering in Medicine and Biology Society, 2008. EMBS 2008. 30th Annual International Conference of the IEEE, vol., No., pp. 1120,1123, Aug. 20-25, 2008.*

(Continued)

*Primary Examiner* — Stanley K Hill
*Assistant Examiner* — David H Kim
(74) *Attorney, Agent, or Firm* — NSIP Law

(57) ABSTRACT

A user activity real-time recognition apparatus and method are provided and include a collector configured to collect a frequency-domain signal for each user activity and to generate learning data based on the frequency-domain signal. The apparatus and method also include an extractor configured to extract a user activity feature from the frequency-domain signal based on an activity feature extracting model. The activity feature extracting model is learned based on the learning data from the collector. The apparatus and method further include a classifier configured to analyze the user activity feature to classify a user activity pattern based on an activity pattern classifying model and configured to transmit the classified user activity pattern to an application device.

24 Claims, 5 Drawing Sheets

(56) References Cited

FOREIGN PATENT DOCUMENTS

| KR | 10-2010-0008071 A | 1/2010 |
|---|---|---|
| KR | 10-2010-0052372 A | 5/2010 |

OTHER PUBLICATIONS

Mannini, Andrea, and Angelo Maria Sabatini. "Machine learning methods for classifying human physical activity from on-body accelerometers." Sensors 10.2 (2010): 1154-1175.*

* cited by examiner

APPARATUS AND METHOD FOR RECOGNIZING USER ACTIVITY

CROSS-REFERENCE TO RELATED APPLICATION

This application claims the benefit under 35 U.S.C. §119 (a) of a Korean Patent Application No. 10-2012-0032615, filed on Mar. 29, 2012, the entire disclosure of which is incorporated herein by reference for all purposes.

BACKGROUND

1. Field

The following description relates to user activity recognition technology. For example, a technique is described to recognize a user's activity in real time regardless of how a user contains a mobile terminal.

2. Description of the Related Art

With high-performance and high density integration of mobile terminals, such as smart phones, various kinds of physical or logical sensors are installed in mobile terminals. The sensors are evolving to generate various kinds of information in order to improve users' convenience. Recently, many mobile terminals include sensors, such as a global positioning system (GPS), an ambient light sensor, an acceleration sensor, a Gyroscope, a magnetic field sensor, and other similar sensors.

As a result, a technique of recognizing a user's physical activity using an acceleration sensor, which is generally called a user activity recognition technique, has been introduced. The purpose of the user activity recognition technique is to correctly recognize the user's various physical activities, for example, walking, running, going up/down the stairs, etc. in order to apply the recognized activity to various technical fields.

In addition, in order to effectively utilize the user activity recognition technique, it is necessary to recognize a user's activity in real time, regardless of a current holding of a mobile terminal. For example, regardless of whether the user is holding the mobile terminal in on hand, a pocket, or a bag, it is necessary to recognize the user's activity in real time to effectively utilize the user activity recognition technique. Accordingly, studies of a technique to correctly recognize a user's activity in real time regardless of how the user is containing the mobile terminal have been conducted.

SUMMARY

The following description relates to a user activity recognition technique to recognize a user's activity in real time, regardless of how the user contains a mobile terminal.

In accordance with an illustrative configuration, there is provided a user activity recognition apparatus including a collector configured to collect a frequency-domain signal for each user activity and to generate learning data based on the frequency-domain signal. The apparatus also includes an extractor configured to extract a user activity feature from the frequency-domain signal based on an activity feature extracting model. The activity feature extracting model is learned based on the learning data from the collector. The apparatus includes a classifier configured to analyze the user activity feature to classify a user activity pattern based on an activity pattern classifying model and configured to transmit the classified user activity pattern to an application device.

The user activity recognition apparatus also includes an activity feature extracting model database configured to store the activity feature extracting model and configured to provide the activity feature extracting model to the extractor, and an activity pattern classifying model database configured to store the activity feature classifying model and configured to provide the activity pattern classifying model to the classifier.

The user activity recognition apparatus also includes a user activity recognizer including the extractor and the classifier and configured to extract the user activity feature with reference to the activity feature extracting model database and to classify the user activity pattern according to the user activity feature by searching the activity pattern classifying model database.

The recognizer further includes a Fast Fourier transformer configured to transform a normalized signal unrelated to how the user contains a mobile terminal to the frequency-domain signal.

The user activity recognition apparatus also includes a first sensor configured to detect a first signal to analyze a user activity, a second sensor configured to detect a second signal to correct the first signal, and a signal normalizer configured to normalize the first signal to a signal unrelated to how the user contains the mobile terminal using the second signal.

The classifier transmits information about the user activity pattern to the application device enabling recognition of an activity of a user.

The application device is a device controller.
The application device is a user activity analyzer.
The application device is a life logging device.
The application device is a user context recognizer.
The learning data collector collects the frequency-domain signal for each user activity, transformed by the Fast Fourier transformer.

The learning data collector transmits the learning data to the learning server.

The first sensor is a sensor including a device coordinate system related to how the user contains the mobile terminal.

The first sensor is a sensor including a global coordinate system unrelated to how the user contains the mobile terminal.

The signal normalizer is a Global Coordinate Transformer (GCT) configured to obtain normalized acceleration data unrelated to how the user contains the mobile terminal by rotating a 3-axis device coordinate detected by an acceleration sensor. The acceleration sensor includes a device coordinate system related to how the user contains the mobile terminal to a global coordinate detected by a magnetic field sensor, wherein the magnetic field sensor having a global coordinate system unrelated to how the user contains the mobile terminal.

The user activity recognition apparatus also includes a learning server configured to learn the activity feature extracting model based on the learning data from the collector. The learning server includes an activity feature extracting model learning unit configured to learn activity feature extracting models using a group of learning data collected by the collector, to select an optimal activity feature extracting model from among the activity feature extracting models, and to store the selected optimal activity feature extracting model in an activity feature extracting model database.

The learning server further includes an activity pattern classifying model learning unit configured to learn activity pattern classifying models using the activity feature extracting models learned by the activity feature extracting model learning unit, to select an optimal activity pattern classifying model from among the activity pattern classifying models, and to store the selected activity pattern classifying model in an activity pattern classifying model database.

In accordance with another example, there is provided a user activity recognition method including collecting, at a collector, a frequency-domain signal for each user activity, and generating learning data based on the frequency-domain signal. The method also includes extracting, at an extractor, a user activity feature from the frequency-domain signal based on an activity feature extracting model. The activity feature extracting model is learned based on the learning data from the collector. The method also includes analyzing, at a classifier, the user activity feature to classify a user activity pattern based on an activity pattern classifying model.

The user activity recognition method also includes storing the activity feature extracting model in an activity feature extracting model database, and storing the activity feature classifying model in an activity pattern classifying model database.

The user activity recognition method includes extracting the user activity feature with reference to the activity feature extracting model database, and classifying the user activity pattern according to the user activity feature by searching the activity pattern classifying model database.

The generating of the learning data includes collecting the frequency-domain signal for each user activity based on a Fast Fourier transformation, generating the learning data based on the frequency-domain signal, and transmitting the learning data to a learning server.

The user activity recognition method further includes transmitting information about the user activity pattern to an application device to enable recognition of an activity of a user.

A computer program embodied on a non-transitory computer readable medium, the computer program configured to control a processor to perform the user activity recognition method collecting, at a collector, a frequency-domain signal for each user activity, and generating learning data based on the frequency-domain signal. The computer program configured to control the processor method also includes extracting, at an extractor, a user activity feature from the frequency-domain signal based on an activity feature extracting model. The activity feature extracting model is learned based on the learning data from the collector. The computer program configured to control the processor also includes analyzing, at a classifier, the user activity feature to classify a user activity pattern based on an activity pattern classifying model.

Other features and aspects will be apparent from the following detailed description, the drawings, and the claims.

Figure 1:
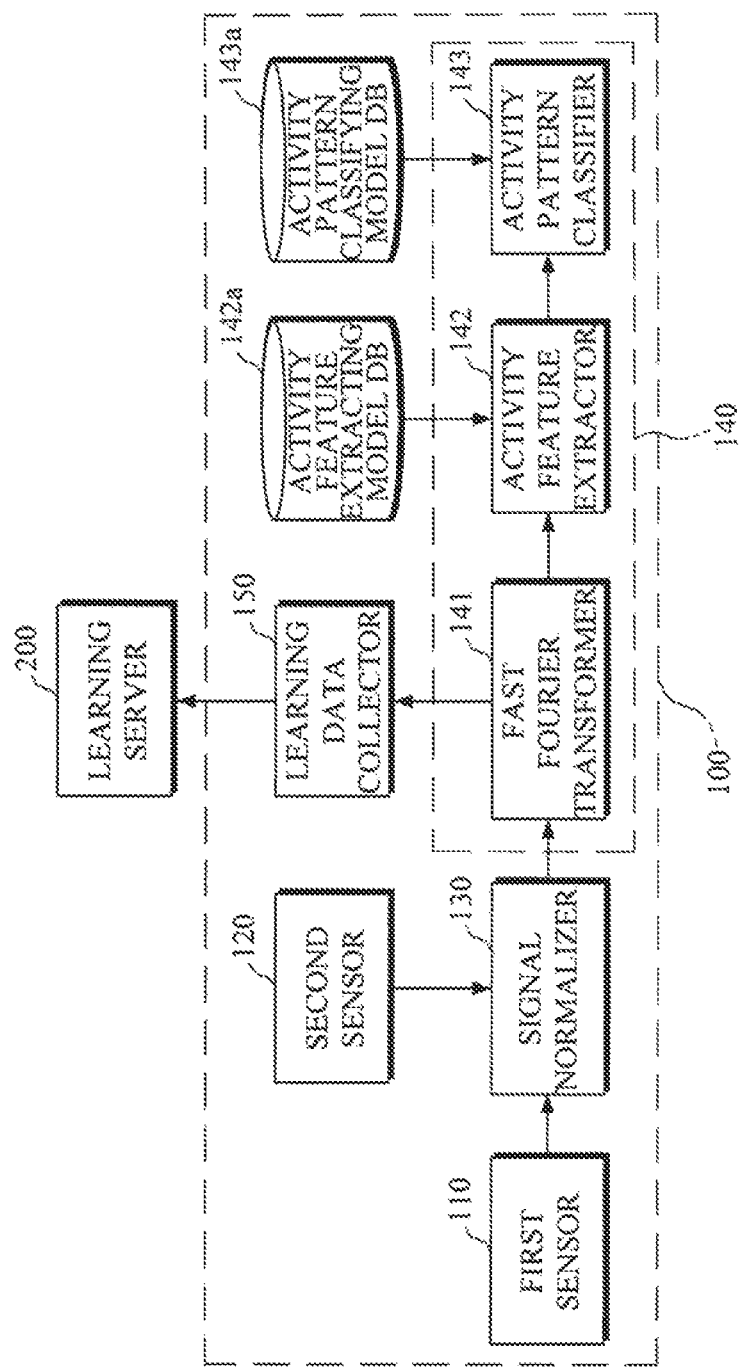
FIG. 1 is a diagram illustrating an example of a user activity real-time recognition apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a user activity real-time recognition apparatus 100. Referring to FIG. 1, the user activity real-time recognition apparatus 100 may include a first sensor 110, a second sensor 120, a signal normalizer 130, and a user activity recognizer 140.

The first sensor 110 detects a first signal for analyzing an activity from a user or user activity. For example, the first sensor 110 may be an acceleration sensor including a device coordinate system related to how the user contains a mobile terminal. Here, how the user contains the mobile terminal is a housing, container, or position of the mobile terminal and may include, but is not limited to a particular hand holding the mobile terminal, a pocket, or a bag.

The first sensor 110 installed in a mobile terminal, such as a smart phone, generally includes a device coordinate system related to how the user contains the mobile terminal. The first sensor 110 detects a change in an orientation of the mobile terminal according to a change in how the user contains the mobile terminal. The device coordinate system is changed to cause rotation ambiguity. To resolve this ambiguity, the user activity real-time recognition apparatus 100 includes the second sensor 120, which detects a second signal to correct the first signal detected by the first sensor 110. For example, the second sensor 120 may be a magnetic field sensor unrelated to how the user contains the mobile terminal. A magnetic field sensor installed in the mobile terminal, such as a smart phone, generally includes a global coordinate system unrelated to how the user contains the mobile terminal. The global coordinate system is unaltered, although the orientation of the mobile terminal may change due to a change in how the user contains the mobile terminal.

The signal normalizer 130 corrects the first signal detected by the first sensor 100 using the second signal detected by the second sensor 120 by normalizing the first signal to a signal unrelated to how the user contains the mobile terminal. For example, the signal normalizer 130 may be a Global Coordinate Transformer (GCT) that obtains normalized acceleration data unrelated to how the user contains the mobile terminal. The GCT rotates a 3-axis device coordinate detected by an acceleration sensor having a device coordinate system, which is related to how the user contains the mobile terminal, to a global coordinate detected by a magnetic field sensor having a global coordinate system, which is unrelated to how the user contains the mobile terminal. In other words, when the orientation of the mobile terminal changes due to a change in how the user contains the mobile terminal, the device coordinate system may be changed accordingly to cause rotation ambiguity. The device coordinate system may be rotated to the global coordinate system using a signal detected by the magnetic field sensor to thereby transform a signal related to how the user contains the mobile terminal to acceleration data on the global coordinate system unrelated to how the user contains the mobile terminal.

The user activity recognizer 140 recognizes a user activity pattern from the signal normalized by the signal normalizer 130. In one example, the user activity recognizer 140 includes a Fast Fourier transformer 141, an activity feature extractor 142, and an activity pattern classifier 143.

The Fast Fourier transformer 141 transforms a time-domain signal unrelated to how the user contains the mobile terminal, normalized by the signal normalizer 130, to a frequency-domain signal. That is, the Fast Fourier transformer 141 vectorizes time series sequences.

The user specific activity pattern influences a specific frequency of acceleration data, and the user activity recognizer 140 transforms the acceleration data on the global coordinate system unrelated to how the user contains the mobile terminal. For example, the normalized time-domain signal unrelated to how the user contains the mobile terminal is transformed to a frequency-domain signal through the Fast Fourier transformer 141.

The activity feature extractor 142 extracts a user's activity feature from the frequency-domain signal. At this time, the activity feature extractor 142 may be configured to extract the user's activity feature from the frequency-domain signal referencing, based on, or as a function of an activity feature extracting model database (DB) 142a, which, in one illustrative example, stores activity feature extracting models. For example, the activity feature extractor 142 may extract the user's activity feature from the frequency-domain signal in real time using a Machine Learning Model (MLM), such as Principle Component Analysis (PCA), Non-negative Matrix Factorization (NMF), Linear Discriminant Analysis (LDA), Independent Component Analysis (ICA), and other alternative or similar extracting models.

The activity pattern classifier 143 analyzes the user's activity feature extracted by the activity feature extractor 142 to classify the user's activity pattern. In one example, the activity pattern classifier 143 may be configured to analyze or classify the user's activity pattern according to the user's activity feature referencing, based on, or as a function of an activity pattern classifying model database (DB) 143a that stores activity pattern classifying models. For example, the activity pattern classifier 143 may classify the user's activity pattern according to the user's activity feature using a MLM, such as Bayesian Network Classifier (BNC), Support Vector Machine (SVC), and other alternative or similar user's activity patterns.

Furthermore, the activity pattern classifier 143 may be configured to transmit information about the user's activity pattern to an application device. For example, the application device may be a device controller that controls a ring volume of the mobile terminal, a user's activity analysis device that monitors a user's daily activity in real time, a life logging device, a user context recognition device, and customized advertisement search based on a user's activity, and other alternative or similar user's activity patterns.

As result, the user activity real-time recognition apparatus 100, in accordance with an illustrative example, may correctly recognize the user's activity in real time regardless of how the user contains the mobile terminal. The user activity real-time recognition apparatus 100 may apply the recognized user's activity to various application fields, such as device control of the mobile terminal, the user's activity analysis, life logging, the user's context recognition, customized advertisement, and other alternative or similar fields.

According to another illustrative example, the user activity real-time recognition apparatus 100 may further include a learning data collector 150. The learning data collector 150 collects a frequency-domain signal for each user activity, transformed by the Fast Fourier transformer 141, to generate learning data.

Because the same user activity may generate different acceleration data signals depending on how the user contains the mobile terminal, a method of using only thresholds to extract the user's activity features may have some limitations. Accordingly, in order to extract a user's activity features that are robust to how the user contains a mobile terminal, acceleration data can be generated according to how the user contains the mobile terminal for each user activity class. Such acceleration data may be collected in a frequency domain through the learning data collector 150 to generate learning data. The learning data collector 150 may be configured to transmit the learning data to the learning server 200.

In one illustrative example, the first sensor 110, the second sensor 120, the signal normalizer 130, the learning server 200, the Fast Fourier transformer 141, the activity feature extractor 142, and the activity pattern classifier 143, each may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The first sensor 110, the second sensor 120, the signal normalizer 130, the learning server 200, the Fast Fourier transformer 141, the activity feature extractor 142, and the activity pattern classifier 143, each may run an operating system (OS) and one or more software applications that run on the OS. The processing device also may access, store, manipulate, process, and create data in response to execution of the software. For purpose of simplicity, the description of the first sensor 110, the second sensor 120, the signal normalizer 130, the learning server 200, the Fast Fourier transformer 141, the activity feature extractor 142, and the activity pattern classifier 143, each is used as singular; however, one skilled in the art will appreciated that a processing device may include multiple processing elements and multiple types of processing elements. For example, the first sensor 110, the second sensor 120, the signal normalizer 130, the learning server 200, the Fast Fourier transformer 141, the activity feature extractor 142, and the activity pattern classifier 143, each may include multiple processors or a processor and a controller. In addition, different processing configurations are possible, such a parallel processors.

Figure 2:
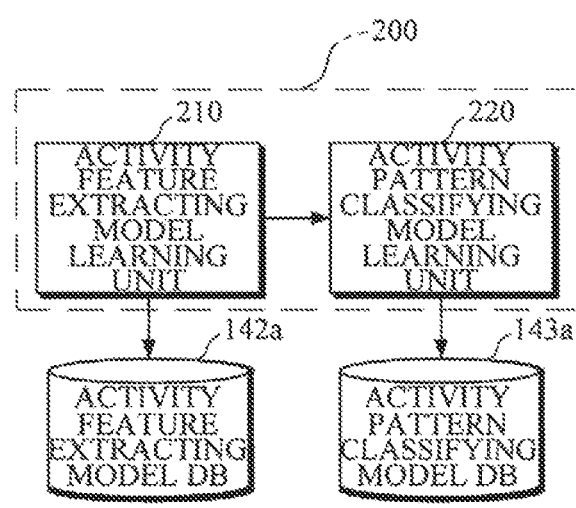
FIG. 2 is a diagram illustrating an example of a learning server.

FIG. 2 is a diagram illustrating an example of the learning server 200. As illustrated in FIG. 2, the learning server 200 may include an activity feature extracting model learning unit 210 and an activity pattern classifying model learning unit 220.

The activity feature extracting model learning unit 210 learns activity feature extracting models using a group of learning data collected by the learning data collector 150, selects an optimal activity feature extracting model from among the activity feature extracting models, and stores the selected activity feature extracting model in the activity feature extracting model DB 142a (see FIG. 1).

Because a specific activity pattern influences a specific frequency of acceleration data, through the learning data collector 150, the activity feature extracting model learning unit 210 learns activity feature extracting models by collecting frequency-domain learning data corresponding to possible user activity patterns for each type of possession of a mobile terminal. The activity feature extracting model learning unit 210 selects an optimal activity feature extracting model from among the activity feature extracting models. The activity feature extracting model learning unit 210 also stores the selected activity feature extracting model in the activity feature extracting model DB 142*a*. For example, the activity feature extracting model may be a MLM, such as PCA, NMF, LDA, ICA, and other alternative or similar extracting models.

The units described herein may be implemented using hardware components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

Figure 3:
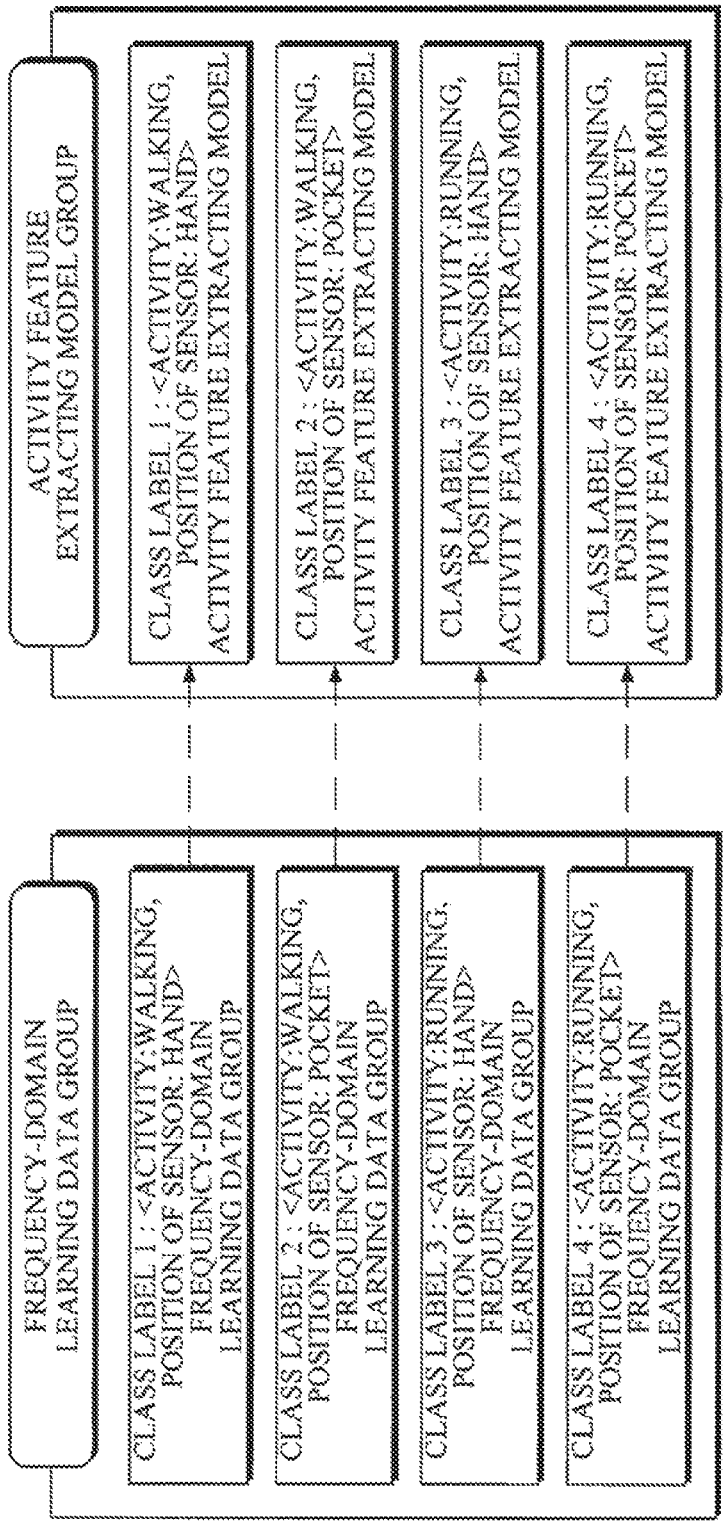
FIG. 3 shows examples of activity feature extracting models.

FIG. 3 shows examples of activity feature extracting models.

Referring to FIGS. 1, 2, and 3, the activity pattern classifying model learning unit 220 learns activity pattern classifying models using the activity feature extracting models learned by the activity feature extracting model learning unit 210. The activity pattern classifying model learning unit 220 selects an optimal activity pattern classifying model from among the activity pattern classifying models, and stores the selected activity pattern classifying model in the activity pattern classifying model DB 143*a*.

If activity feature models, according to every possible manner in which the user contains the mobile terminal for each user activity class, are extracted by the activity feature extracting model learning unit 210, the activity pattern classifying model learning unit 220 may classify and learn user activity patterns according to the user activity features for each type of possession of the mobile terminal. For example, each of the activity classifying models may be a MLM, such as BNC, SVN, and other alternative or similar extracting models.

Figure 4:
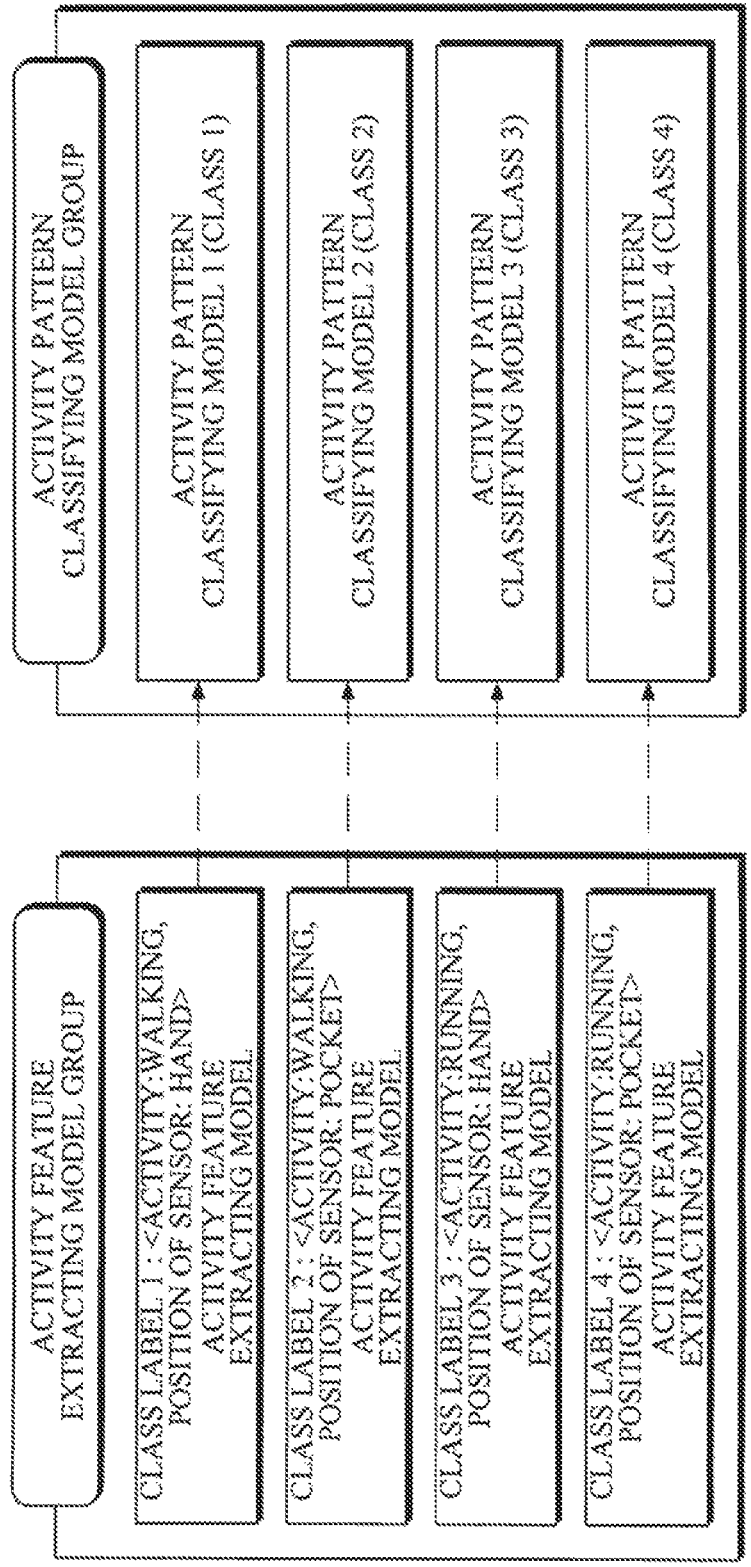
FIG. 4 shows examples of activity pattern classifying models.

FIG. 4 shows examples of activity pattern classifying models.

In one example, a plurality of activity pattern classifying models may be respectively configured in correspondence to individual class labels, or a single activity pattern classifying model may be configured for all class labels. An activity feature extracting model learning and activity pattern classifying model learning may be once performed in a batch manner, and then performed gradually based on frequency-domain learning data provided, as necessary, to enable activity recognition adaptive to the user's activity pattern.

Thereafter, without learning activity feature extracting models and activity pattern classifying models, the user's activity can be recognized in real time based on the previously learned activity feature extracting models and activity pattern classifying models.

Hereinafter, a user activity recognition method of the user activity real-time recognition apparatus as described above will be described with reference to FIG. 5.

Figure 5:
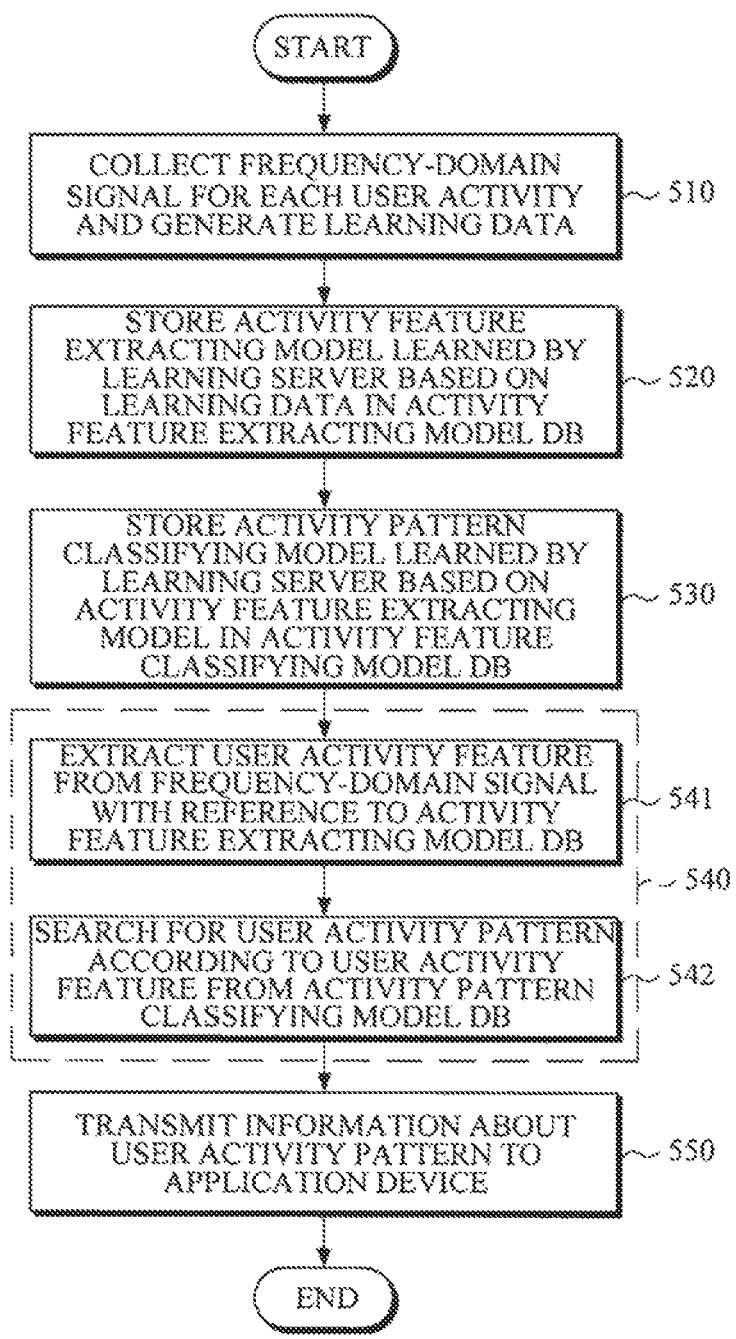
FIG. 5 is a flowchart illustrating an example of a user activity real-time recognition method.

FIG. 5 is a flowchart illustrating an example of a user activity real-time recognition method.

At 510, the user activity real-time recognition apparatus collects a frequency-domain signal for each user activity and generates learning data. For example, the user activity real-time recognition apparatus may collect a Fast Fourier-transformed frequency-domain signal for each user activity to generate learning data, and transmit the learning data to a learning server.

Because the same user activity may generate different acceleration data signals depending on how the user contains the mobile terminal, a method of using only thresholds to extract the user's activity features may have some limitations. Accordingly, in order to extract the user's activity features that may be robust to how the user contains the mobile terminal, acceleration data can be generated according to how the user contains the mobile terminal for each user activity class. The acceleration data is collected in a frequency domain through the user activity real-time recognition apparatus to generate learning data.

The collected learning data is transmitted to the learning server. The learning server learns activity feature extracting models and activity pattern classifying models based on the learning data, and stores the results of the learning in the mobile terminal so that the mobile terminal can correctly recognize the user's activity. As a result, the mobile terminal can correctly recognize the user's activity based on the learned activity extracting models and activity pattern classifying models, regardless of how the user contains the mobile terminal.

At 520, the user activity real-time recognition apparatus stores the activity feature extracting models learned by the learning server based on the learning data in an activity feature extracting model DB. A method in which the learning server learns activity feature extracting models based on learning data has been described above and, accordingly, a detailed description thereof will be omitted.

Successively, the user activity real-time recognition apparatus stores the activity pattern classifying models learned by the learning server, based on the activity feature extracting models, in an activity pattern classifying model DB. A method in which the learning server learns activity pattern classifying models based on activity feature extracting models also has been described above and, accordingly, a detailed description thereof will be omitted.

Furthermore, according to another aspect, the user activity real-time recognition method may further perform, at 540, extracting a user's activity feature with reference to activity feature extracting model DB, which stores activity feature extracting models, and activity pattern classification model DB, which stores activity pattern classifying models.

To extract the user's activity feature, at 541, the method extracts the user's activity feature from a frequency-domain signal with reference to the activity feature extracting model DB. At 542, the method searches for user's activity pattern according to the user's activity feature from activity pattern classifying model DB.

For example, in order to classify the user activity pattern, the user activity real-time recognition apparatus, such as the mobile terminal, detects a first signal for user activity analysis through a first sensor. In one example, the first sensor may be an acceleration sensor having a device coordinate system related to how the user contains the mobile terminal. An acceleration sensor which is installed in a mobile terminal, such as a smart phone, generally includes a device coordinate system related to how the user contains the mobile terminal. As a result, when the orientation of the mobile terminal is changed according to a change in type of possession of the mobile terminal, the device coordinate system is also changed to cause rotation ambiguity.

Furthermore, the user activity real-time recognition apparatus detects a second signal for correcting the first signal through a second sensor. For example, the second sensor may be a magnetic field sensor unrelated to how the user contains the mobile terminal. A magnetic field sensor installed in the mobile terminal, such as a smart phone, generally includes a global coordinate system unrelated to how the user contains the mobile terminal. In this instance, the global coordinate system may not change although the orientation of the mobile terminal may change due to a change in type of possession of the mobile terminal.

The user activity real-time recognition apparatus corrects the first signal using the second signal to normalize the first signal to a signal unrelated to how the user contains the mobile terminal. For example, a GCT is used to obtain normalized acceleration data unrelated to how the user contains the mobile terminal by rotating a 3-axis device coordinate detected by an acceleration sensor. The acceleration sensor may include a device coordinate system related to how the user contains the mobile terminal to a global coordinate detected by a magnetic field sensor. The magnetic field sensor may include a global coordinate system unrelated to how the user contains the mobile terminal.

In other words, when the orientation of the mobile terminal is changed due to a change in type of possession of the mobile terminal, the device coordinate system is accordingly changed to cause rotation ambiguity. The device coordinate system is changed to the global coordinate system using a signal detected by the magnetic field sensor to transform a signal related to how the user contains the mobile terminal to acceleration data on the global coordinate system unrelated to how the user contains the mobile terminal.

Thereafter, the user activity real-time recognition apparatus recognizes the user's activity pattern from the normalized signal unrelated to how the user contains the mobile terminal. At this time, the user activity real-time recognition apparatus performs Fast Fourier Transformation (FFT) on the normalized time-domain signal unrelated to how the user contains the mobile terminal. The user real-time recognition apparatus performs the FFT to generate a frequency-domain signal. In one example, the user activity real-time recognition apparatus vectorizes time series sequences through FFT.

Because a user's specific activity pattern may influence a specific frequency of acceleration data, the user activity real-time recognition apparatus performs FFT to transform the acceleration data on the global coordinate system unrelated to how the user contains the mobile terminal. In one example, the normalized time-domain signal unrelated to how the user contains the mobile terminal is transformed to a frequency-domain signal. Then, the user activity real-time recognition apparatus extracts the user's activity feature from the frequency-domain signal. At this time, the user activity real-time recognition apparatus may be configured to extract the user's activity feature from the frequency-domain signal with reference to the activity feature extracting model DB that stores activity feature extracting models.

For example, the user activity real-time recognition apparatus may extract the user's activity feature from the frequency-domain signal using a MLM, such as PCA, NMF, LDA, ICA, and other alternative or similar extracting models, as described above.

Then, the user activity real-time recognition apparatus analyzes the extracted user's activity feature to classify the user's activity pattern. The user activity real-time recognition apparatus may be configured to classify the user's activity pattern according to the user's activity feature. Such configuration may be performed by searching the activity pattern classifying model DB that stores activity pattern classifying models. For example, the user activity real-time recognition apparatus may search for the user's activity pattern according to the user's activity feature using a MLM, such as BNC, SVN, and other alternative or similar models.

In addition, according to another aspect, at 550, the user activity real-time recognition method may transmit information about the user's activity pattern found in 540 to an application device. For example, the application device may be a device controller, a user's activity analysis device, a life logging device, a user context recognition device, and other alternative or similar devices.

Thereby, it is possible to correctly recognize a user's activity in real time regardless of how the user contains a mobile terminal which the user possesses. The recognized user's activity can be applied to various application fields, such as device control of the mobile terminal, the user's activity analysis, life logging, the user's context recognition, and other alternative or similar application fields.

It is to be understood that in the embodiment of the present invention, the operations in FIG. 5 are performed in the sequence and manner as shown although the order of some steps and the like may be changed without departing from the spirit and scope of the present invention. In accordance with an illustrative example, a computer program embodied on a non-transitory computer-readable medium may also be provided, encoding instructions to perform at least the method described in FIG. 5.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user activity recognition apparatus, comprising:
   a collector configured to collect a frequency-domain signal for a user activity and to generate learning data based on the frequency-domain signal;
   an activity feature extracting model that is learned based on the learning data from the collector;
   an extractor configured to extract a user activity feature from the frequency-domain signal based on the activity feature extracting mode;
   a classifier configured to analyze the user activity feature to classify a user activity pattern based on an activity pattern classifying model and configured to transmit the classified user activity pattern to an application device;
a first sensor configured to detect a first signal to analyze a user activity; and
a second sensor configured to detect a second signal to correct the first signal;
wherein the learning data corresponds to user activity patterns related to user containment of a mobile terminal.

2. The user activity recognition apparatus of claim 1, further comprising:
an activity feature extracting model database configured to store the activity feature extracting model and configured to provide the activity feature extracting model to the extractor; and
an activity pattern classifying model database configured to store the activity feature classifying model and configured to provide the activity pattern classifying model to the classifier.

3. The user activity recognition apparatus of claim 2, further comprising:
a user activity recognizer comprising the extractor and the classifier and configured to extract the user activity feature with reference to the activity feature extracting model database and to classify the user activity pattern according to the user activity feature by searching the activity pattern classifying model database.

4. The user activity recognition apparatus of claim 2, wherein the recognizer further comprises a Fast Fourier transformer configured to transform a normalized signal unrelated to how the user contains a mobile terminal to the frequency-domain signal.

5. The user's activity recognition apparatus of claim 1, further comprising:
a signal normalizer configured to normalize the first signal to a signal unrelated to how the user contains the mobile terminal using the second signal.

6. The user activity recognition apparatus of claim 1, wherein the classifier transmits information about the user activity pattern to the application device enabling recognition of an activity of a user.

7. The user activity recognition apparatus of claim 6, wherein the application device is a device controller.

8. The user activity recognition apparatus of claim 6, wherein the application device is a user activity analyzer.

9. The user activity recognition apparatus of claim 6, wherein the application device is a life logging device.

10. The user activity recognition apparatus of claim 6, wherein the application device is a user context recognizer.

11. The user activity recognition apparatus of claim 4, wherein the learning data collector collects the frequency-domain signal for each user activity, transformed by the Fast Fourier transformer.

12. The user activity recognition apparatus of claim 1, wherein the learning data collector transmits the learning data to the learning server.

13. The user activity recognition apparatus of claim 5, wherein the first sensor is a sensor including a device coordinate system related to how the user contains the mobile terminal.

14. The user activity recognition apparatus of claim 13, wherein the first sensor is a sensor including a global coordinate system unrelated to how the user contains the mobile terminal.

15. The user activity recognition apparatus of claim 14, wherein the signal normalizer is a Global Coordinate Transformer (GCT) configured to obtain normalized acceleration data unrelated to how the user contains the mobile terminal by rotating a 3-axis device coordinate detected by an acceleration sensor, wherein the acceleration sensor comprises a device coordinate system related to how the user contains the mobile terminal to a global coordinate detected by a magnetic field sensor, wherein the magnetic field sensor has a global coordinate system unrelated to how the user contains the mobile terminal.

16. The user activity recognition apparatus of claim 1, further comprising:
a learning server configured to learn the activity feature extracting model based on the learning data from the collector, wherein the learning server comprises an activity feature extracting model learning unit configured to learn activity feature extracting models using a group of learning data collected by the collector, to select an optimal activity feature extracting model from among the activity feature extracting models, and to store the selected optimal activity feature extracting model in an activity feature extracting model database.

17. The user activity recognition apparatus of claim 16, wherein the learning server further comprises an activity pattern classifying model learning unit configured to learn activity pattern classifying models using the activity feature extracting models learned by the activity feature extracting model learning unit, to select an optimal activity pattern classifying model from among the activity pattern classifying models, and to store the selected activity pattern classifying model in an activity pattern classifying model database.

18. A user activity recognition method comprising:
collecting, at a collector, a frequency-domain signal for a user activity;
generating learning data based on the frequency-domain signal;
extracting, at an extractor, a user activity feature from the frequency-domain signal based on an activity feature extracting model, wherein the activity feature extracting model is learned based on the learning data from the collector;
analyzing, at a classifier, the user activity feature to classify a user activity pattern based on an activity pattern classifying model;
detecting, by a first sensor, a first signal to analyze a user activity; and
detecting, by a second sensor, a second signal to correct the first signal,
wherein the learning data corresponds to user activity patterns related to user containment of a mobile terminal.

19. The user activity recognition method of claim 18, further comprising:
storing the activity feature extracting model in an activity feature extracting model database; and
storing the activity feature classifying model in an activity pattern classifying model database.

20. The user activity recognition method of claim 19, further comprising:
extracting the user activity feature with reference to the activity feature extracting model database; and
classifying the user activity pattern according to the user activity feature by searching the activity pattern classifying model database.

21. The user activity recognition method of claim 18, wherein the generating of the learning data comprises
collecting the frequency-domain signal for each user activity based on a Fast Fourier transformation, generating the learning data based on the frequency-domain signal, and transmitting the learning data to a learning server.

22. The user activity recognition method of claim 20, further comprising:

transmitting information about the user activity pattern to an application device to enable recognition of an activity of a user.

23. A computer program embodied on a non-transitory computer readable medium, the computer program configured to control a processor to perform the user activity recognition method of claim 18.

24. The user activity recognition apparatus of claim 1, wherein a device coordinate system is rotated to a global coordinate system using the second signal detected by the second sensor to transform the first signal related to how the use contains the mobile terminal to acceleration data on the global coordinate system unrelated to how the user contains the mobile terminal.

* * * * *